United States Patent [19]

Tachibana

[11] Patent Number: 4,622,636
[45] Date of Patent: Nov. 11, 1986

[54] SYSTEM AND METHOD FOR AUTOMATICALLY CONTROLLING VEHICLE SPEED

[75] Inventor: Akira Tachibana, Yokosuka, Japan

[73] Assignee: Nissan Motor Company, Limited, Japan

[21] Appl. No.: 609,973

[22] Filed: May 14, 1984

[30] Foreign Application Priority Data

May 23, 1983 [JP] Japan .............................. 58-76028[U]

[51] Int. Cl.⁴ .......................................... G06F 15/50
[52] U.S. Cl. ...................... 364/424; 340/53; 340/904; 180/169; 364/431.07; 342/70
[58] Field of Search ................. 364/431.07, 440, 424, 364/426; 340/53, 902, 903, 904; 343/7 VC, 7 VM; 180/169, 177, 179

[56] References Cited

U.S. PATENT DOCUMENTS

| | | | |
|---|---|---|---|
| 3,442,347 | 5/1969 | Hodgson et al. | 180/169 |
| 3,705,639 | 12/1972 | Colling et al. | |
| 3,869,019 | 3/1975 | Cardani | |
| 3,921,749 | 11/1975 | Kawada | 340/904 |
| 3,946,707 | 3/1976 | Gray | |
| 3,952,301 | 4/1976 | Sorkin | 343/7 VM |
| 4,394,739 | 7/1983 | Suzuki et al. | |
| 4,434,469 | 2/1984 | Suzuki et al. | |
| 4,451,890 | 5/1984 | Suzuki et al. | |
| 4,519,469 | 5/1985 | Hayashi et al. | 340/903 |
| 4,539,642 | 9/1985 | Mizuno et al. | 364/431.07 |

FOREIGN PATENT DOCUMENTS

| | | |
|---|---|---|
| 2900461 | 1/1979 | Fed. Rep. of Germany . |
| 55-86000 | 6/1980 | Japan . |
| 2003358 | 3/1979 | United Kingdom ........... 343/7 VM |

OTHER PUBLICATIONS

*Spektrum der Wissenschaft,* Jun. 1980, pp. 24–34.
Summary of English Translation, J.P. Application Unexamined open No. SHO-55-86000, pp. 10-25.

*Primary Examiner*—Parshotam S. Lall
*Attorney, Agent, or Firm*—Lane and Aitken

[57] ABSTRACT

A system and method for automatically controlling the speed of an automotive vehicle holds the vehicle speed constantly at a set vehicle speed when there are no other vehicles in front of the vehicle and controls the vehicle speed so as to follow another vehicle moving in front of the vehicle according to the distance between the two vehicles. The system disables both of the above-described functions when the vehicle speed is outside of a predetermined speed range around a set vehicle speed after the leading vehicle is no longer in front of the vehicle or a predetermined interval of time after the other vehicle has disappeared from a front detection area.

8 Claims, 6 Drawing Figures

SYSTEM AND METHOD FOR AUTOMATICALLY CONTROLLING VEHICLE SPEED

BACKGROUND OF THE INVENTION

1. Field of the Invention

The present invention relates to a system and method for automatically controlling vehicle cruising speed, particularly the system and method for automatically controlling vehicle speed in such a way that either the vehicle moves constantly at a predetermined vehicle speed when there are no other vehicles in front of the given vehicle in which the system is mounted or the given vehicle automatically tracks the other vehicle immediately in front thereof.

2. Description of the Prior Art

Recently, there are increased numbers of automotive vehicles which employ a system for holding the vehicle at a constant predetermined speed. Consequently, in order to add to the versatility of such systems, it has been proposed that such systems control the vehicle running speed so that the vehicle follows other vehicles in front of it according to the detected distance to the preceding vehicle, thus preventing collisions with the other vehicle and generally improving drivability.

Such a system is disclosed in Japanese Patent Application Publication No. 55-86000, the disclosure of which is hereby incorporated by reference.

In more detail, the proposed system is so designed that the vehicle is forced to move at a set speed when the distance between the vehicle and the vehicle immediately in front of it exceeds a safety margin determined according to the set vehicle speed and that, the vehicle speed is adjusted so that the vehicle tracks the other vehicle at the same vehicle speed when the inter-vehicle distance drops below the safety margin.

In conventional vehicle cruise control systems, the system is disabled when the vehicle speed deviates from the set speed by more than a predetermined speed in order to prevent overload of the engine when no other vehicle is present in front thereof, i.e., out of the safety margin. However, such a disabling function incorporated in the system is not performed in a case when the front vehicle is moving at a low speed even if the actual vehicle speed is below a lowest limit with respect to the set vehicle speed while the vehicle tracks the front vehicle.

In addition, there is a problem that in a case when the front vehicle cruises below the lowest limit speed and has suddenly disappeared out of a range in which the distance from a front vehicle can be measured, e.g., at an intersection during the automatic tracking for the front vehicle, the system is disabled by the above-described disabling function since the vehicle speed is below the lowest limit with respect to the set speed and consequently the vehicle driver must purposely operate the vehicle and system thereof to reach the set vehicle speed.

SUMMARY OF THE INVENTION

With the above-described problem in mind, it is an object of the invention to provide a system and method for automatically controlling a vehicle speed of an automotive vehicle, wherein an appropriate disabling of the automatic control of the vehicle speed is made without the need of operation by a driver.

More specifically, the present invention allows an automatic speed control system to respond appropriately to cases in which a lead vehicle, previously tracked by the system to control the speed of a following vehicle, moves abruptly out of the system detection range of the inter-vehicle distance, for example, at an intersection. The system is not disabled for a predetermined period of time after the other vehicle moving in front of the vehicle has suddenly disappeared although the vehicle speed is below the lower predetermined speed value with respect to the set vehicle speed.

Consequently, the system can reduce the burden of the driver purposely to operate the vehicle to reach the set vehicle speed.

BRIEF DESCRIPTION OF THE DRAWINGS

A more complete understanding of the present invention may be obtained from the following detailed description taken in conjunction with the drawings in which.

DETAILED DESCRIPTION OF THE PREFERRED EMBODIMENTS

Reference will be made hereinafter to the drawings in order to facilitate explanation of the present invention.

Figure 1:
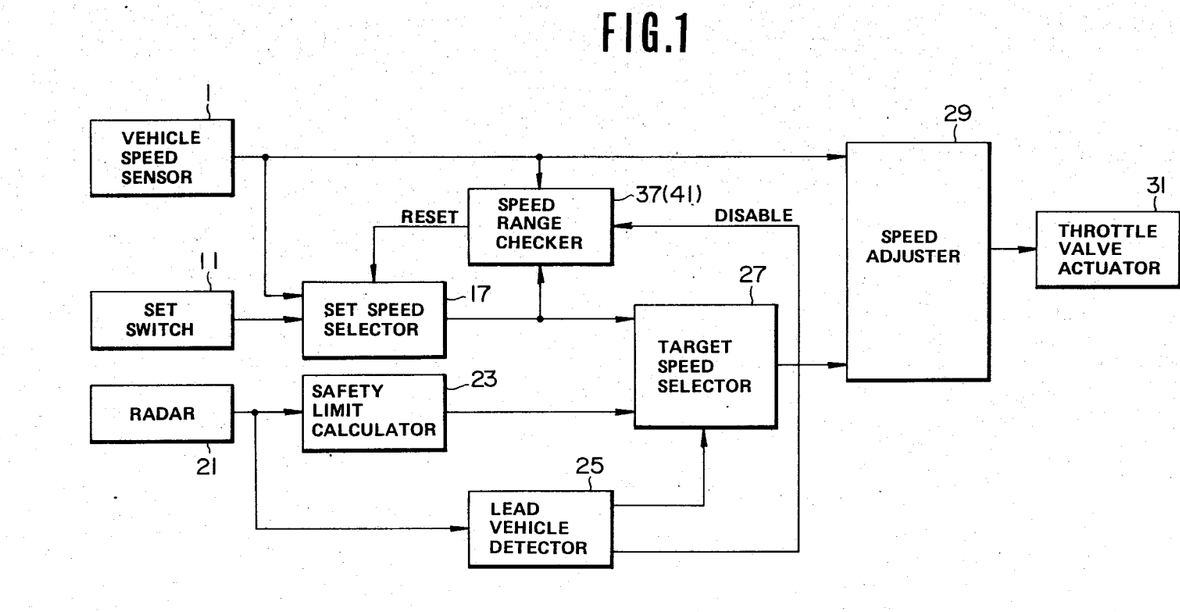
FIG. 1 is a simplified block diagram of the system for automatically controlling the vehicle speed according to the present invention.

FIG. 1 is a functional block diagram of the system for automatically controlling vehicle speed according to the present invention.

A set switch 11 is manually operable to simultaneously activate the control system and latch the current vehicle speed value registered by a vehicle speed sensor 1 in a set speed selector 17. The system also receives information from a radar unit 21 which outputs a signal indicative of the distance to the immediately preceding vehicle, if any. The radar signal is used by a safety limit calculator 23 to derive an upper speed limit value which represents the highest safe speed at the given inter-vehicle distance. The radar signal is also used by a lead vehicle detector 25 to produce a binary signal indicative of the presence or absence of a vehicle in front of the detecting vehicle.

The set speed value from selector 17 and the upper limit value from the calculator 23 are sent to a target speed selector 27, which also receives the output of lead vehicle detector 25. In the presence of a vehicle in front of the detecting vehicle, the target speed selector 27 outputs the upper speed limit value reflecting the highest speed at which the vehicle should follow the preceding vehicle. In the opposite case, the set speed value is output by the target speed selector 27, reflecting that the vehicle is free to cruise.

The current vehicle speed value from sensor 1 and the output of target speed selector 27 are sent to a speed adjuster circuit 29. Speed adjuster 29 compares the two inputs and outputs a signal indicative of their difference to an actuator 31 controlling the position of the throttle valve or analogous vehicle speed actuator. Thus, speed adjuster 29 adjusts actual vehicle speed in such a way that the speed measured by sensor 1 approaches the speed selected by target speed selector 27.

The current speed value from sensor 1 and the set speed value from selector 17 are compared by a speed range check circuit 37. If the current speed is lower than the set speed by more than a predetermined value, the speed range check circuit 37 resets the set speed in set speed selector 17 to zero. However, the check circuit itself disabled when lead vehicle detector 25 signal signals the presence of a leading vehicle. Thus, check circuit 37 is active only when target speed selector 27 transmits the set speed. In summary, the speed range check circuit 37 is a fail-safe which returns speed control to the driver when the vehicle speed is excessively low due to conditions other than the presence of a slow-moving vehicle in front of the vehicle in question.

Figure 2:
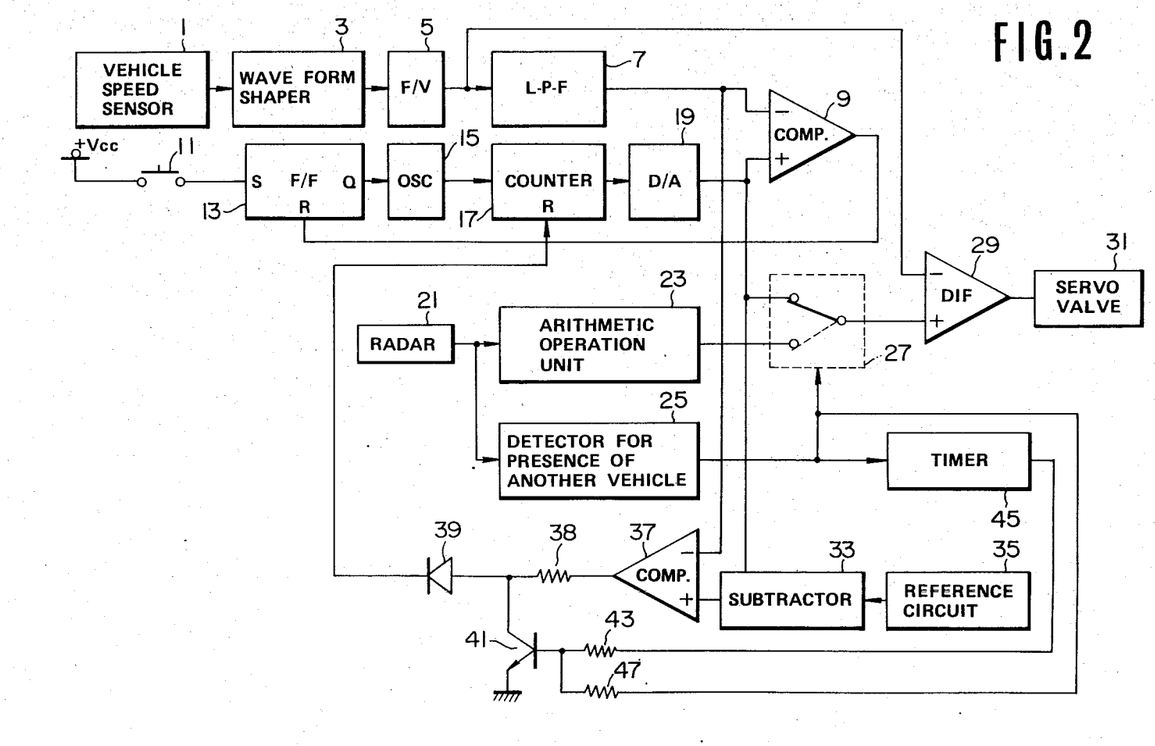
FIG. 2 is a simplified block diagram of a first preferred embodiment.

FIG. 2 is a simplified block diagram of a first preferred embodiment according to the present invention using discrete components. Numeral 1 denotes a vehicle speed sensor which detects the present vehicle speed. The output signal of the vehicle speed sensor 1, which is in the form of a train of pulses, is shaped by means of a waveform shaper 3 and is converted by means of a frequency-to-voltage converter 5 into a corresponding voltage level. The converted voltage is sent to both a low pass filter 7 (L.P.F.) and the inverting input terminal of a differential amplifier 29. Numeral 11 denotes a set switch which initiates speed control when closed. Numeral 13 denotes a flip-flop, the set terminal of which is connected to a voltage source via the set switch 11. Numeral 15 denotes an oscillator, e.g., astable multivibrator, which outputs a train of pulses at a fixed frequency while activated by the flip-flop (F/F) 13. The output pulses of the oscillator 15 are counted by a counter 17, the value of which is converted by a digital/analog converter 19 (D/A converter) into a corresponding voltage level which is then sent to the noninverting input terminal of the first comparator 9.

The output terminal of the first comparator 9 is connected to the reset terminal of the flip-flop 13 so that the flip-flop 13 is reset to produce a "0" level output at its Q output terminal when the voltage level at the output terminal of the D/A converter 19 exceeds the voltage level corresponding to the detected vehicle speed. Therefore, the counter 17 holds a number of pulses closely corresponding to the vehicle speed (set speed) when the set switch 11 is turned on.

In addition, numeral 21 denotes a radar unit connected to an arithmetic operation unit 23 and to a detection circuit 25 and which detects and signals the presence and range of the vehicle immediately in front of the vehicle. The arithmetic operation unit 23 calculates a target vehicle speed at which the vehicle should move according to a distance signal outputted by the radar 21. On the other hand, the detection circuit 25 determines whether there is another vehicle leading the vehicle according to the distance signal outputted from the radar 21. The detection circuit 25 outputs a high level signal when the vehicle is led by another and a low-level signal when there is no preceding vehicle.

Numeral 27 denotes a change-over switch which connects the noninverting input terminal of a differential operational amplifier 29 to either the output terminal of the counter 17 via the D/A converter 19 or the output terminal of the arithmetic operation unit 23. The differential operational amplifier 29 controls a servo valve 31 which adjusts the angular position of a throttle valve (not shown) disposed within a throttle chamber of an engine according to the difference in level between the vehicle speed signal from the frequency-to-voltage converter 5, and the signal selected by the change-over switch 27, which is controlled by the output signal of the detection circuit 25. In more detail, when the change-over switch 27 connects the noninverting input terminal of the differential amplifier 29 to the output terminal of the D/A converter 19 via the switch 27 upon receipt of signal from the detection circuit 25, i.e., when the operational amplifier 29 receives the voltage of the D/A converter 19 corresponding to the vehicle speed selected when the set switch 11 was last closed as indicated in the solid line 27, the differential amplifier 29 controls the servo valve 31 so as to match the detected vehicle speed to the set vehicle speed. On the other hand, when the noninverting input terminal of the operational amplifier 29 is connected to the output terminal of the arithmetic operation unit 23 via the change-over switch 27, the operational amplifier 29 adjusts the vehicle speed to an appropriate level according to the distance to the other vehicle.

Numeral 33 denotes a subtractor which receives the output signals of the D/A converter 19 and of a reference voltage generation circuit 35 and subtract a reference voltage corresponding to a predetermined vehicle speed (, e.g., 10 km/h) outputted by the reference voltage generation circuit 35 from the output signal corresponding to the vehicle speed selected when the set switch 11 was depressed. The subtractor 33 thus calculates a lower limit of vehicle speed. The signal voltage corresponding to the lower vehicle speed limit is sent to the noninverting input terminal of a second comparator 37. Since the inverting input terminal of the second comparator 37 is connected to the output terminal of the L.P.F. (low pass filter) 7, the second comparator 37 outputs a high-level signal so that the counter 17 is reset via a resistor 38 and diode 39 when the detected vehicle speed decreases below the lower vehicle speed limit. Thus, automatic control of the vehicle cruising speed is disabled when the counter 17 is cleared.

The collector of a transistor 41 is connected to the output terminal of the second comparator 37 via the resistor 38. The emitter thereof is grounded, and the base thereof is connected to a timer 45 via a resistor 43 and connected to the detection circuit 25 described above via a resistor 47, respectively. Therefore, the transistor 41 serves to render the line connected to the output terminal of the second comparator 37 equal to the ground when turned on in response to the high-level voltage applied to its base via the timer 45 or detection circuit 25. That is to say, the transistor 41 conducts so that the line connected to the output terminal of the second comparator 37 via the resistor 38 is forceably grounded in response to a high-level signal from the detection circuit 25 or a high-level signal from the timer 45. The timer 45 outputs a high-level signal for a fixed period of time in response to change of the output signal level of the detection circuit 25 from a high level to a low level when the vehicle leading the detecting vehicle has disappeared. In this way, the timer 45 is operated so that the transistor 41 turns on and the reset of the counter 17 is continuously disabled for a fixed period of time after the detection circuit 25 outputs the low level signal. Therefore, the cruising control for the vehicle speed according to the inter-vehicle distance is not disabled for the fixed period of time after the other vehicle moving in front of the vehicle has suddenly disappeared even when the vehicle speed is below the lower predetermined speed value with respect to the set vehicle speed.

It should be noted that the duration of the high-level signal outputted by the timer 45, i.e., the fixed period of time described above, is set equal to the time required for the vehicle speed to increase to the set vehicle speed and may be adjusted according to the difference between the instantaneous vehicle speed and the selected vehicle speed.

Figure 3:
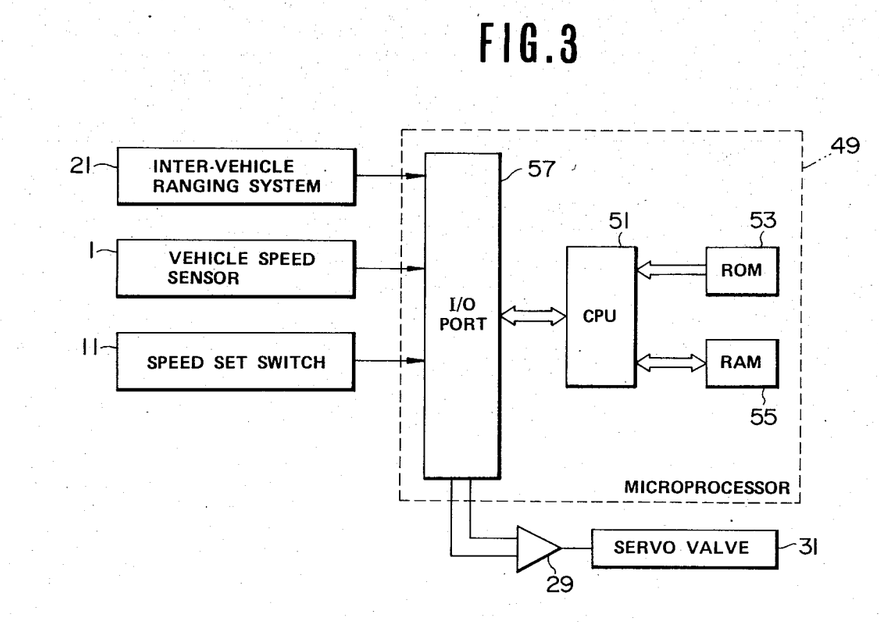
FIG. 3 is another simplified block diagram of the first preferred embodiment shown in FIG. 2 wherein the system comprises a microprocessor.

The above-described preferred embodiment can also be achieved by means of a microprocessor 49, such as is shown in FIG. 3. The operational flowchart of FIG. 4 on which the microprocessor 49 executes will be described below.

The microprocessor 49 comprises a Central Processing Unit (CPU) 51, Read Only Memory (ROM) 53, Random-Access Memory (RAM) 55, and Input/Output Port 57.

Figure 4:
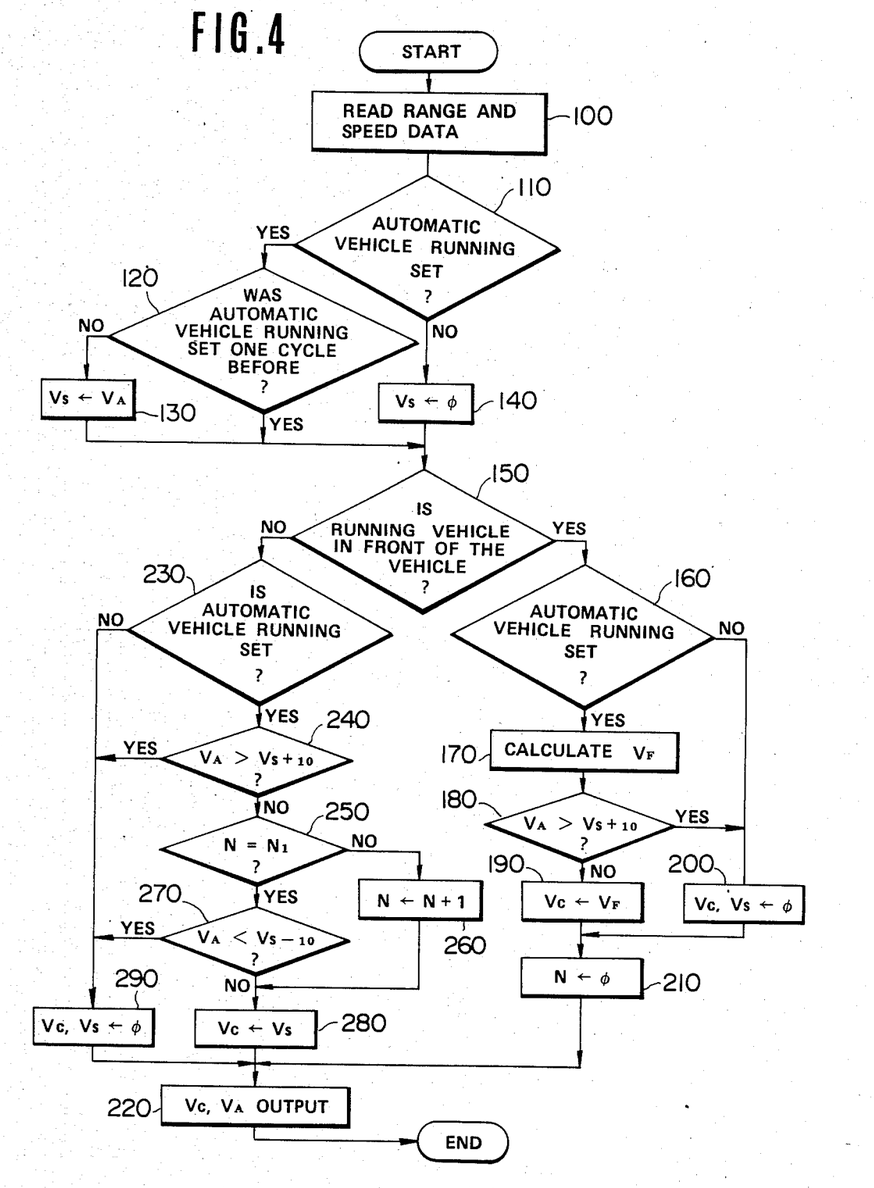
FIG. 4 is an operational flowchart of the first preferred embodiment using the microprocessor shown in FIG. 3.

When an interrupt signal is received which occurs fixed frequency, the CPU 51 reads the data representing the distance to the preceding vehicle from the radar 21 or similar inter-vehicle ranging system and data on the current vehicle speed $V_A$ from the vehicle speed sensor 1 in step 100. The set switch 11 is checked in the subsequent step 110 to see if an automatic speed control is desired. If not, a set speed value $V_S$ is reset to zero in step 140, effectively disabling automatic speed control and control passes to step 150. If the set switch is closed at step 110, then it is checked in step 120 to see if it was closed during the previous processing cycle. If not, i.e., if the set switch 11 was first closed immediately before this processing cycle, the routine goes to step 130 wherein the set vehicle speed $V_S$ is set equal to the actual speed $V_A$. Control then passes to step 150. If the set switch 11 had been set earlier, the routine goes directly to step 150 from step 130, since the set vehicle speed value $V_S$ has already been assigned a value.

In step 150, the ranging data acquired in step 110 is checked to see if the vehicle is trailing another vehicle. If there is no other vehicle in the step 150, the routine goes to the step 160. If there is a leading vehicle in the step 150, the routine goes to step 230. It should be noted that the presence of a leading vehicle may be recognized when the number of pulses reflected from a forward detection area, during each processing routine cycle exceeds a predetermined number for a predetermined interval of time.

In the step 160, the CPU 51 confirms that the set switch 11 is still set. If the set switch 11 is set in the step 160, the CPU 51 calculates the tracking vehicle speed $V_F$ at which to follow the lead vehicle, i.e., the vehicle speed allowing safe braking according to the distance R, derived from the equation $V_F = K\sqrt{F}$ (K: constant number). In the next step 180, the vehicle speed $V_A$ is compared with an upper set vehicle speed limit $V_S+10$, which is a constant vehicle speed (, e.g., 10 km/h) higher than the set vehicle speed $V_S$. If $V_A \leq V_S+10$ in the step 180, the routine goes to step 190 wherein the controlled vehicle speed $V_C$ is set equal to the tracking vehicle speed $V_F$. In the next step 210, a register N is set to zero in step 210, the function of the register N being described later. In the next step 220, the CPU 51 outputs the actual vehicle speed $V_A$ and controlled vehicle speed $V_C$ and then waits for the next interrupt signal before returning to step 100. If the set switch 11 is reset immediately before the step 160 or if $V_A > V_S+10$ in step 180, the routine goes to the step 200 wherein the set vehicle speed $V_S$ and the controlled vehicle speed $V_C$ are cleared in order to disable the vehicular speed control and goes to the step 210.

On the other hand, when the routine goes to the step 230 from the step 150, the CPU 51 confirms that the set switch 11 is still set. If YES in the step 150, the routine goes to step 240 wherein the current vehicle speed $V_A$ is compared with the value $V_S+10$. If $V_A \leq V_S+10$ in the step 240, the routine goes to step 250 wherein the value of the register N indicating elapsed time after the lead vehicle leaves the detection area is compared with a fixed duration $N_1$. That is to say, the step 250 determines whether the fixed duration $N_1$ has passed since the lead vehicle left the forward detection area. If $N = N_1$, i.e., if the fixed duration $N_1$ has passed since the lead vehicle left the forward detection area in the step 250, the routine goes to step 270 wherein the vehicle speed $V_A$ is compared with the lower speed limit $V_S-10$. If $V_A \geq V_S-10$ (NO) in the step 270, the routine goes to step 280 wherein the controlled vehicle speed $V_C$ is set to the set vehicle speed $V_S$ so as to control the vehicle to move constantly at the set vehicle speed $V_S$. Thereafter the routine goes to the step 220.

If $V_A < V_S-10$ (YES) in the step 270, the routine goes to step 290, wherein the set vehicle speed $V_S$ and controlled vehicle speed $V_C$ are cleared to diable the vehicle speed control. Thereafter, the routine goes to the step 220. In addition, if $N \neq N_1$ (NO) in the step 250, the routine goes to step 260, wherein the contents of the register N is incremented since the fixed duration $N_1$ described above has not yet elapsed, and then to the step 280. It should also be noted that if the CPU 51 confirms that the set switch 11 is reset in the step 230 or if $V_A > V_S-10$ in the step 270, the routine goes to step 290 wherein the set vehicle speed $V_S$ and controlled vehicle speed $V_C$ are cleared to zero.

Furthermore, it should be noted that in a case when the set switch 11 is set with no lead vehicle in front of the vehicle, the processing routine in FIG. 4 is as follows: START → step 100 → step 110 → step 120 → step 130 → step 150 → step 230 → step 240 → step 250 → step 260 → step 280 → step 220 → END → START → step 100 → step 110 → step 120 → step 150 → step 230 → step 240 (if $V_A > V_S+10$) → step 290 → step 220 → END: (or if $V_A \leq V_S+10$ in the step 240) → step 250 → step 260 → step 280 → step 220 → END; (if $N = N_1$ in step 250) step 270 → step 280 → step 220 → END; and (if $V_A < V_S-10$ in the step 270) step 290 → step 220 → END. In this case, the contents of the register N is set to zero at the initialization of the microcomputer. Therefore, the comparison of the current vehicle speed $V_A$ with the lowest limit of the set vehicle speed $V_S-10$ in the step 270 is not performed for the fixed duration $N_1$ as shown in FIG. 4. However, the fixed duration $N_1$ is rather a short period of time, e.g., twenty seconds. Therefore, there is no danger of applying the overload to the engine even under such a processing described above.

Figure 5:
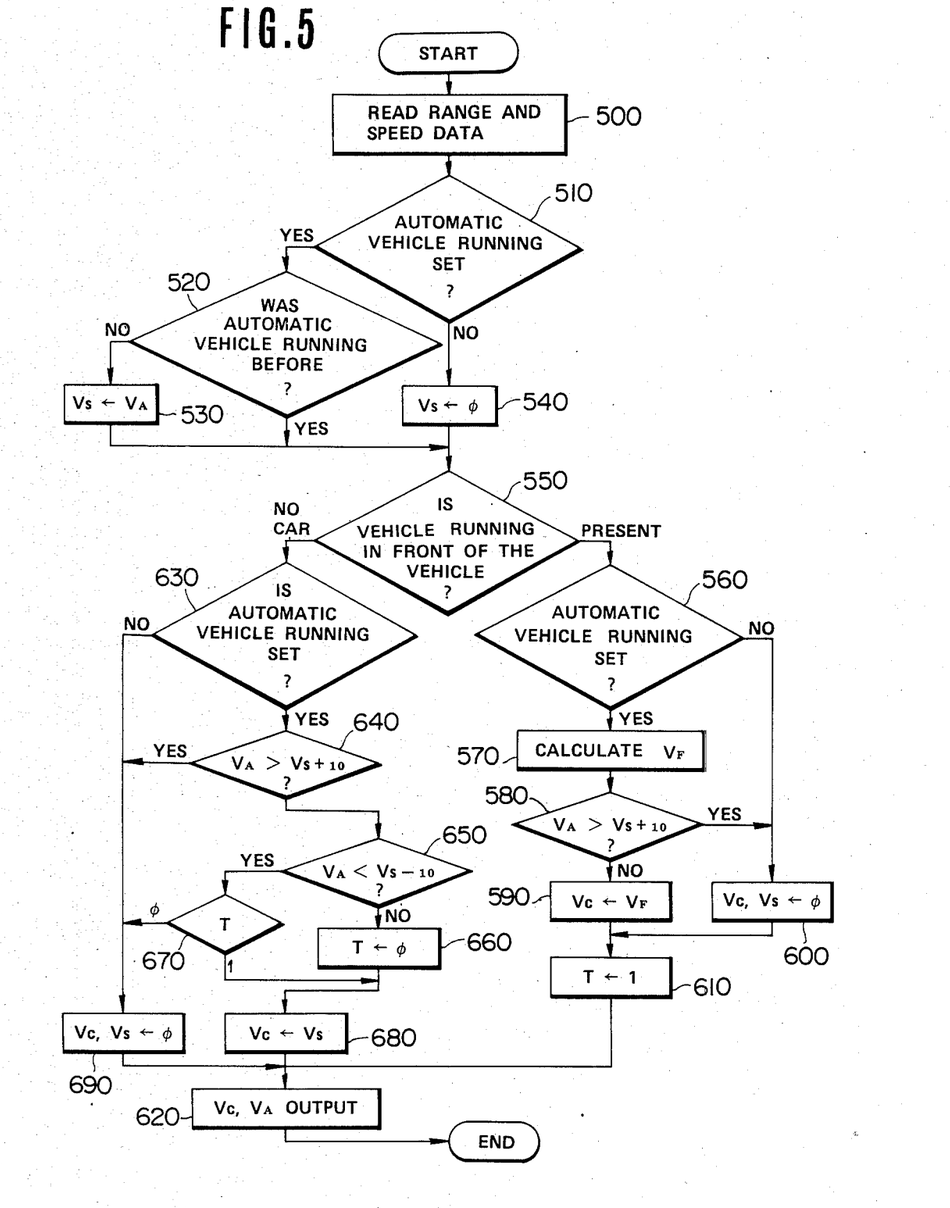
FIG. 5 is an operational flowchart of a second preferred embodiment using the microprocessor shown in FIG. 3.

FIG. 5 is a second preferred embodiment of the present invention.

In an operational flowchart of FIG. 5, immediately after the lead vehicle disappears from the forward detection area, the controlled vehicle speed $V_C$ is set equal to the set vehicle speed $V_S$ regardless of the actual vehicle speed $V_A$. This causes the vehicle to accelerate when the actual speed $V_A$ is low due to the prior proximity of the lead vehicle. After the vehicle has accelerated to the point where the vehicle speed $V_A$ exceeds the lower set vehicle speed limit $V_S-10$, vehicle speed control routine returns to accordance with FIG. 4 so that the control process will end if the vehicle speed soon drops.

As seen in FIG. 5, the only deviation from the embodiment of FIG. 4 is in steps 610, 650, 660, and 670. Therefore, only these steps will be explained in detail.

If the routine goes to the step 650 corresponding to step 270 in FIG. 4, wherein the vehicle speed $V_A$ is compared with $V_S-10$, and if $V_A \geqq V_S-10$ in the step 650, i.e., if the vehicle speed exceeds the lower set vehicle speed speed, due possibly to the acceleration to the set vehicle speed $V_S$ induced after the lead vehicle disappears, a flag T is reset in the step 660 so as to allow disablement of the vehicle speed control after the vehicle speed $V_A$ drops out of the allowable controlled range $V_S \pm 10$ during subsequent interrupt processing. Conversely, if $V_A < V_S-10$ in the step 650, the routine goes to step 670, wherein the CPU 51 determines whether the flag T is set or reset. If the flag T is reset in the step 670, the routine goes to step 690 (same as the step 290) since the CPU 51 determines that the vehicle speed is decreasing abnormally since at least once the vehicle had attained a speed within the allowable range $V_S \pm 10$ after the disappearance of the lead vehicle. In the step 690, the controlled vehicle speed $V_C$ and set vehicle speed $V_S$ are cleared to disable further vehicle speed control.

If the flag T is set in the step 670, the routine goes to the step 680 (same as the step 280) to continue the acceleration control since the vehicle has yet accelerated into the allowable range.

The flag T is initialized to 1 (set) any time the vehicle is tracking a lead vehicle. This ensures that step 680 will be performed at least once after the disappearance of the lead vehicle. Specifically, step 210 of FIG. 4 is replaced with step 610 in which flag T is set.

Figure 6:
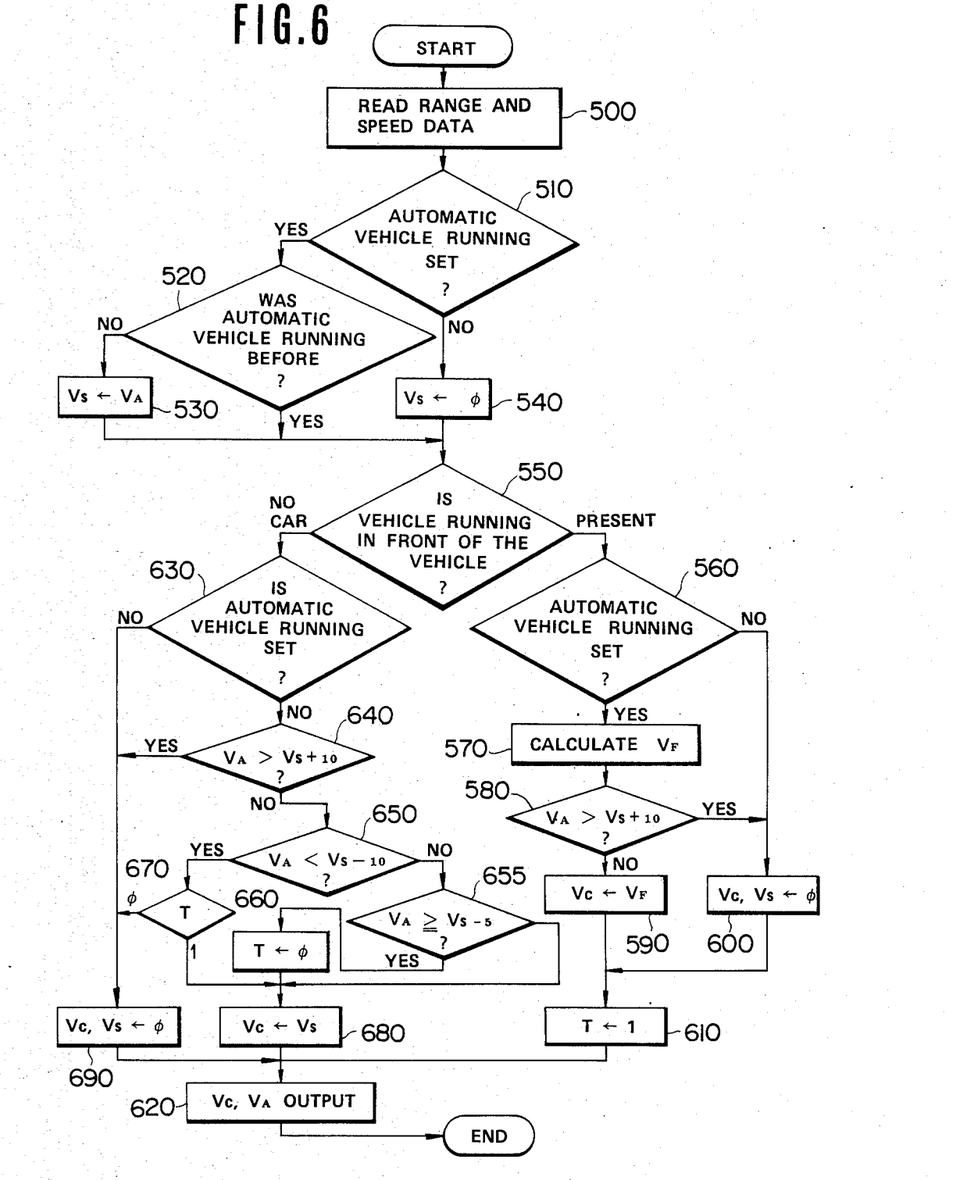
FIG. 6 is an operational flowchart of a third preferred embodiment using the microprocessor shown in FIG. 3.

It should be noted that to simplify processing, the flag T is cleared as soon as $V_A \geqq V_S-10$ in the embodiment shown in FIG. 5. However, as shown in FIG. 6, a new step 655 may be provided subsequent to the step 650 wherein the vehicle speed $V_A$ is compared with the set vehicle speed $V_S$ decremented by a constant vehicle speed which is smaller than the above-described constant vehicle speed (10 km/h), e.g., 5 km/h, to define another threshold $V_S-5$ value which is higher than the lower set vehicle speed limit $V_S-10$. Therefore, the flag T becomes accordingly more difficult to reset. This ensures that the vehicle will accelerate to well within the allowable speed range after the lead vehicle is gone.

In addition, in marginal cases in which the acceleration would not be carried out as desired, e.g., when the lead vehicle disappears while the detecting vehicle is travelling uphill, an overload might be applied to the engine due to the flag T not being cleared. Therefore, after a fixed interval of time has passed after the lead vehicle has disappeared, the flag T may forcibly be cleared to zero.

As described hereinbefore, when the above-described system according to the present invention is applied to the vehicle, disablement of the vehicle speed control is not allowed for a predetermined period of time after a lead vehicle has disappeared from the forward detection area. Therefore, an unnecessary release of the above-described control can be prevented so that there is no need for the driver to assume control of vehicle speed simply because of a temporary change in control parameters.

It will be fully understood by those skilled in the art that the foregoing description is in terms of preferred embodiments and various changes and modifications may be made without departing from the scope of the present invention, which is to be defined by the appended claims.

What is claimed is:

1. A system for automatically controlling a speed of an automotive vehicle, comprising:
   (a) first means for detecting whether another vehicle is moving within a predetermined detectable range in the same direction as the controlled vehicle;
   (b) second means for adjusting the controlled vehicle speed toward a manually set vehicle speed so as to hold the current controlled vehicle speed approximately constant at said set speed when said first means detects that no other vehicle is moving within said predetermined detectable range;
   (c) third means for measuring an intervehicle distance from the controlled vehicle to the other vehicle when said first means detects that the other vehicle is moving within the predetermined detectable range;
   (d) fourth means for detecting the vehicle speed of the controlled vehicle;
   (e) fifth means for calculating an intervehicle distance from the controlled vehicle to the other vehicle on the basis of the detected vehicle speed;
   (f) sixth means for adjusting the controlled vehicle speed to a set vehicle speed so as to follow said other vehicle with the safe intervehicle distance calculated by said fifth means on the basis of the vehicle speed detected by said fourth means when the intervehicle distance measured by said third means exceeds the safe intervehicle distance and for adjusting the controlled vehicle speed to a speed to increase the measured intervehicle distance when the intervehicle distance measured by said third means is shorter than the safe intervehicle distance calculated by said fifth means;
   (g) seventh means for detecting whether the vehicle speed detected by said fourth means is out of a predetermined speed range with respect to the controlled vehicle speed set by said second means after a predetermined time has elapsed after said first means detects that the other vehicle has disappeared out of the predetermined detectable range; and
   (h) eighth means for disabling the function of said second means when said seventh means detects that the controlled vehicle speed detected by said fourth means is out of said predetermined speed range after said predetermined time has elapsed.

2. The system of claim 1, wherein said eighth means further disables the adjusting operation of said second means in response to the determination by said means that the current controlled vehicle speed has increased above a predetermined value higher than said set vehicle speed.

3. The system of claim 1, wherein said second means controls the controlled vehicle speed to said set vehicle speed after said first means determines that said other vehicle is no longer moving in front of the controlled vehicle and said eighth means disables the adjusting operation of said second and sixth means when the current controlled vehicle speed decreases below a predetermined speed value lower than said set vehicle speed after the controlled vehicle speed has once exceeded said predetermined speed value lower than said set vehicle speed.

4. The system according to claim 1 wherein said eighth means also disables the function of said second means when said first means detects that the other vehicle is not moving within said predetermined detectable range and when said seventh means detects that the controlled vehicle speed detected by said fourth means is out of said predetermined speed range.

5. The system of claim 1 further comprising ninth means for disabling said eighth means as long as the current controlled vehicle speed remains within said predetermined speed range.

6. The system of claim 1, wherein said eighth means disables operation of said second and sixth means when the current controlled vehicle speed is outside of said predetermined speed range after the controlled vehicle speed has once been within another predetermined speed range which is smaller than the first-mentioned predetermined speed range.

7. A method for automatically controlling the vehicle speed of an automotive vehicle, comprising the steps of:
(a) detecting the vehicle speed of the controlled vehicle;
(b) adjusting continually the controlled vehicle speed toward a set vehicle speed so as to maintain the current controlled vehicle speed approximately at the set vehicle speed;
(c) detecting whether there is an other vehicle moving in front of the controlled vehicle within a given distance from the controlled vehicle, if there is said other vehicle in front of the controlled vehicle;
(d) controlling the vehicle speed of the controlled vehicle in accordance with the distance to said other vehicle in response to the determination in said step (c) that said other vehicle is moving in said front detection area of the controlled vehicle;
(e) determining whether at least one predetermined condition of disabling the control operations carried out in said step (b) is satisfied in response to the determination that said other vehicle detected at step (c) is no longer in front of the controlled vehicle said predetermined condition being such that it is satisfied when the controlled vehicle speed detected in said step (a) is out of a predetermined speed range with respect to the set vehicle speed in said step (a) after detecting that said other vehicle is not in front of the controlled vehicle at step (c) for a predetermined time interval; and
(f) disabling the control operations carried out in said step (b) in response to the determination in said step (e) that said predetermined condition is satisfied.

8. A system for automatically controlling the vehicle speed of an automotive vehicle, comprising:
(a) vehicle speed sensor means for detecting the current vehicle speed of the controlled vehicle;
(b) set switch means for setting an automatic cruising speed;
(c) set speed selector means for selecting the set vehicle speed from the current vehicle speed of the controlled vehicle derived from said controlled vehicle speed sensor means when said set switch means is turned on;
(d) radar detector means for detecting and signalling a distance to another vehicle moving in front of the controlled vehicle;
(e) lead vehicle detector means for detecting and signalling the presence of said other vehicle moving in front of the controlled vehicle according to an output signal derived from said radar detector means;
(f) safety limit calculator means for calculating and outputting the controlled vehicle speed according to the detected distance derived from said radar detector means;
(g) target speed selector means for selecting and outputting either of the output signals from said set speed selector means or from said safety limit calculator means depending on the presence of the output signal derived from said lead vehicle detector means;
(h) speed adjuster means for comparing the controlled vehicle speed sensor means with the output signal derived from said target speed selector means and outputting a signal according to the compared difference therebetween;
(i) throttle valve actuator means for actuating the throttle valve of the vehicular engine of the controlled vehicle according to the output signal derived from said speed adjustor means; and
(j) speed range check means for comparing the vehicle speed signal derived from said controlled vehicle speed sensor means with the output signal indicating the set vehicle speed derived from said set speed selector means subtracted by a predetermined value of speed, and resetting the output of said set speed selector means when the controlled vehicle speed is reduced below the set vehicle speed subtracted by said predetermined vehicle speed either immediately after or a predetermined interval of time after said lead vehicle detector means outputs no signal indicating that said other vehicle is moving in front of the controlled vehicle.

* * * * *